(12) United States Patent
Sharma et al.

(10) Patent No.: US 12,046,062 B2
(45) Date of Patent: Jul. 23, 2024

(54) INTELLIGENT VISUAL REASONING OVER GRAPHICAL ILLUSTRATIONS USING A MAC UNIT

(71) Applicant: Tata Consultancy Services Limited, Mumbai (IN)

(72) Inventors: Monika Sharma, Gurgaon (IN); Arindam Chowdhury, Gurgaon (IN); Lovekesh Vig, Gurgaon (IN); Shikha Gupta, Mandi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 337 days.

(21) Appl. No.: 17/594,578

(22) PCT Filed: May 28, 2020

(86) PCT No.: PCT/IB2020/055076
§ 371 (c)(1),
(2) Date: Oct. 22, 2021

(87) PCT Pub. No.: WO2020/260983
PCT Pub. Date: Dec. 30, 2020

(65) Prior Publication Data
US 2022/0222956 A1 Jul. 14, 2022

(30) Foreign Application Priority Data
Jun. 27, 2019 (IN) .............................. 201921025687

(51) Int. Cl.
*G06F 40/35* (2020.01)
*G06F 16/242* (2019.01)
(Continued)

(52) U.S. Cl.
CPC ............ *G06V 30/41* (2022.01); *G06F 16/243* (2019.01); *G06F 40/35* (2020.01); *G06N 3/045* (2023.01); *G06V 10/454* (2022.01)

(58) Field of Classification Search
CPC ........ G06N 3/045; G06N 3/044; G06N 20/00; G06N 3/08; G06N 3/02; G06F 40/35;
(Continued)

(56) References Cited

U.S. PATENT DOCUMENTS 9,965,705 B2   5/2018  Chen et al.
2016/0350653 A1* 12/2016 Socher ..................... G06N 5/04
(Continued)

FOREIGN PATENT DOCUMENTS

CN          106951473 A      7/2017

OTHER PUBLICATIONS

Reddy, Revanth et al., "FigureNet : A Deep Learning model for Question-Answering on Scientific Plots", Machine Learning, Date: Apr. 2019, Publisher: Arxiv, https://arxiv.org/pdf/1806.04655.pdf.
(Continued)

*Primary Examiner* — Jakieda R Jackson
(74) *Attorney, Agent, or Firm* — FINNEGAN, HENDERSON, FARABOW, GARRETT & DUNNER LLP

(57) ABSTRACT

This disclosure relates generally to intelligent visual reasoning over graphical illustrations using a MAC unit. Prior arts use visual attention to map particular words in a question to specific areas in an image to memorize the corresponding answers, thereby resulting in a limited capability to answer questions of a specific type. The present disclosure incorporates the MAC unit to enable reasoning capabilities and accordingly attend to an area in the image to find the answer. The present disclosure therefore allows generalizing over a possible set of questions with varying complexities so that (Continued)

an unseen question can also be answered correctly based on the reasoning methods that it has learned. The system and method of the present disclosure can be used for understanding of visual information when processing documents like business reports, research papers, consensus reports etc. containing charts and reduce the time spent in manual analysis.

9 Claims, 6 Drawing Sheets

(51) Int. Cl.
*G06N 3/045* (2023.01)
*G06V 10/44* (2022.01)
*G06V 30/41* (2022.01)

(58) Field of Classification Search
CPC ........ G06F 40/30; G06F 16/24; G06F 16/246; G06F 40/20; G06F 16/3329; G06F 17/18; G06F 16/9024; G06F 16/35
See application file for complete search history.

(56) References Cited

U.S. PATENT DOCUMENTS

| | | |
|---|---|---|
| 2017/0293638 A1 | 10/2017 | He et al. |
| 2018/0012137 A1 | 1/2018 | Wright et al. |
| 2018/0329884 A1 | 11/2018 | Xiong et al. |
| 2019/0042988 A1 | 2/2019 | Brown et al. |
| 2019/0139218 A1* | 5/2019 | Song ..................... G06N 3/044 |
| 2019/0156204 A1 | 5/2019 | Bresch et al. |

OTHER PUBLICATIONS

Kahou, Samira Ebrahimi et al., "Figureqa: An Annotated Figure Dataset for Visual Reasoning", Computer Vision and Pattern Recognition, Date: Feb. 2018, Publisher: Arxiv, https://arxiv.org/pdf/1710.07300.pdf.

Kafle, Kushal et al., "DVQA: Understanding Data Visualizations via Question Answering", Computer Vision and Pattern Recognition—Graphic, Date: Mar. 2018, Publisher: Arxiv, https://arxiv.org/pdf/1801_08163.pdf.

International Search Report and Written Opinion mailed Oct. 19, 2020, in International Application No. PCT/IB2020/055076; 7 pages.

* cited by examiner

INTELLIGENT VISUAL REASONING OVER GRAPHICAL ILLUSTRATIONS USING A MAC UNIT

CROSS REFERENCE TO RELATED PATENT APPLICATIONS AND PRIORITY

This application is a U.S. National Stage Filing under 35 U.S.C. § 371 and claims priority from International Application No. PCT/IB2020/055076, filed on May 28, 2020, which application claims priority under 35 U.S.C. § 119 from Indian Application No. 201921025687, filed on Jun. 27, 2019. The entire contents of the aforementioned applications are incorporated herein by reference.

TECHNICAL FIELD

The disclosure herein generally relates to visual reasoning, and, more particularly, to visual reasoning over graphical illustrations.

BACKGROUND

Statistical charts are often used to ease the understanding of large volumes of data and relationships between different elements of the data. Fully sighted humans can easily analyze large amount of information presented in a concise and concrete format in the charts. Most systems are not designed to be inclusive since certain capabilities are presumed. For instance, not all users may be fully sighted. Some charts may serve as an input for further processing by other automated systems. This requires systems to be able to perceive accurate visual information from statistical charts and thereafter to reason over the visual percepts. A particular application area of interest from an accessibility perspective is that of reasoning over statistical charts such as bar and pie charts. Despite improvements in perception accuracies brought about via deep learning, developing systems that combine accurate visual perception with an ability to reason over visual percepts remains extremely challenging.

SUMMARY

Embodiments of the present disclosure present technological improvements as solutions to one or more of the above-mentioned technical problems recognized by the inventors in conventional systems.

In an aspect, there is provided a processor implemented method for intelligent visual reasoning over a graphical illustration, the method comprising the steps of: receiving an input associated with the graphical illustration, via a Memory, Attention and Composition (MAC) unit, wherein the input comprises (i) a question embedding associated with a natural language query pertaining to one or more objects from a plurality of objects in the graphical illustration or a relation therebetween and (ii) a feature map for the plurality of objects, and wherein the MAC unit is an end-to-end differentiable neural network comprising a plurality of recurrent MAC cells; performing iteratively, via the MAC unit, a series of attention-based reasoning operations pertaining to the one or more objects relevant to the question embedding, on a plurality of sub-questions comprised in the question embedding such that attention is intelligently directed to the one or more objects in a sequence to obtain a response to the natural language query; generating a concatenated vector, via one or more processors, wherein the concatenated vector comprises (i) an encoded output $m_p$ of the attention-based reasoning operations from intermediate memory states $m_i$ of the plurality of MAC cells at each time step i, wherein the encoded output $m_p$ represents a set of features from the feature map corresponding to the one or more objects in the graphical illustration relevant to the question embedding and (ii) the question embedding; processing the concatenated vector, via a regressor, to predict a bounding box comprising textual answers present in the graphical illustration corresponding to the natural language query; and processing the concatenated vector, via a classifier, to predict a probability distribution over a pre-defined set of generic answers corresponding to the natural language query.

In another aspect, there is provided a system for intelligent visual reasoning over a graphical illustration, the system comprising one or more data storage devices operatively coupled to one or more hardware processors and configured to store instructions executable by the one or more hardware processors to perform operations comprising: receiving an input associated with the graphical illustration, via a Memory, Attention and Composition (MAC) unit (108), wherein the input comprises (i) a question embedding associated with a natural language query pertaining to one or more objects from a plurality of objects in the graphical illustration or a relation therebetween and (ii) a feature map for the plurality of objects, and wherein the MAC unit is an end-to-end differentiable neural network comprising a plurality of recurrent MAC cells; performing iteratively, via the MAC unit, a series of attention-based reasoning operations pertaining to the one or more objects relevant to the question embedding, on a plurality of sub-questions comprised in the question embedding such that attention is intelligently directed to the one or more objects in a sequence to obtain a response to the natural language query; generating a concatenated vector wherein the concatenated vector comprises (i) an encoded output $m_p$ of the attention-based reasoning operations from intermediate memory states $m_i$ of the plurality of MAC cells at each time step i, wherein the encoded output $m_p$ represents a set of features from the feature map corresponding to the one or more objects in the graphical illustration relevant to the question embedding and (ii) the question embedding; processing the concatenated vector, via a regressor, to predict a bounding box comprising textual answers present in the graphical illustration corresponding to the natural language query; and processing the concatenated vector, via a classifier, to predict a probability distribution over a pre-defined set of generic answers corresponding to the natural language query.

In yet another aspect, there is provided a computer program product comprising a non-transitory computer readable medium having a computer readable program embodied therein, wherein the computer readable program, when executed on a computing device, causes the computing device to perform steps comprising: receiving an input associated with the graphical illustration, via a Memory, Attention and Composition (MAC) unit (108), wherein the input comprises (i) a question embedding associated with a natural language query pertaining to one or more objects from a plurality of objects in the graphical illustration or a relation therebetween and (ii) a feature map for the plurality of objects, and wherein the MAC unit is an end-to-end differentiable neural network comprising a plurality of recurrent MAC cells; performing iteratively, via the MAC unit, a series of attention-based reasoning operations pertaining to the one or more objects relevant to the question embedding, on a plurality of sub-questions comprised in the question embedding such that attention is intelligently directed to the one or more objects in a sequence to obtain a response to the natural language query; generating a concatenated vector wherein the concatenated vector comprises (i) an encoded output $m_p$ of the attention-based reasoning operations from intermediate memory states $m_i$ of the plurality of MAC cells at each time step i, wherein the encoded output $m_p$ represents a set of features from the feature map corresponding to the one or more objects in the graphical illustration relevant to the question embedding and (ii) the question embedding; processing the concatenated vector, via a regressor, to predict a bounding box comprising textual answers present in the graphical illustration corresponding to the natural language query; and processing the concatenated vector, via a classifier, to predict a probability distribution over a pre-defined set of generic answers corresponding to the natural language query.

In accordance with an embodiment of the present disclosure, the system described herein above further comprises a pre-trained Convolutional Neural Network (CNN) based residual network configured to generate the feature map corresponding to the graphical illustration and a pre-trained Recurrent Neural Network (RNN) configured to generate the question embedding corresponding to the natural language query.

In accordance with an embodiment of the present disclosure, the pre-trained CNN based network is a residual neural network (ResNet) and the pre-trained RNN is a bi-directional Long Short-Term Memory (biLSTM).

In accordance with an embodiment of the present disclosure, the regressor is pre-trained using mean square error for a regression task and the classifier is pre-trained using a categorical cross-entropy loss for a classification task.

In accordance with an embodiment of the present disclosure, the regressor is configured to process the concatenated vector for predicting a bounding box by generating a 4-dimensional vector, through a sigmoid non-linearity, in which each dimension represents a coordinate value, normalized in the range 0 to 1.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
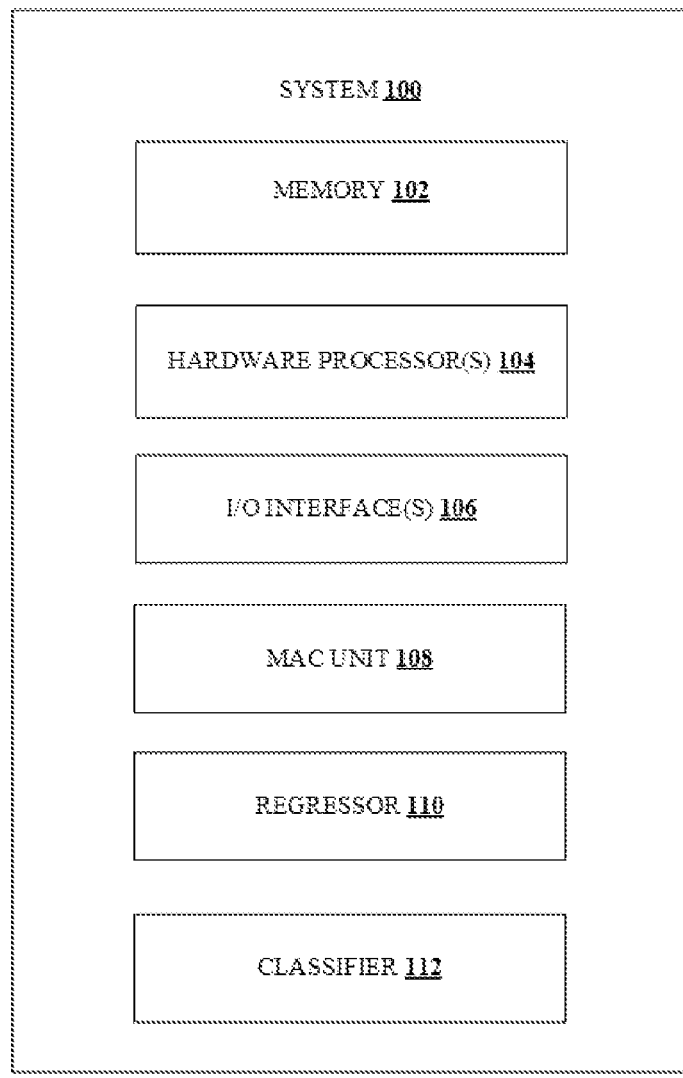
FIG. 1 illustrates an exemplary block diagram of a system for intelligent visual reasoning over graphical illustrations using a Memory, Attention and Composition (MAC) unit according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

The problem of understanding statistical charts has been studied for tasks which focus on chart detection, chart classification, detection and recognition of textual components and information extraction from charts. Mostly computer-vision based techniques have been used to extract visual elements from bar charts. There are methods that extract various textual components from the charts and classify their roles as x-axis, y-axis and use them along with the figure metadata. Again, there are methods that are highly dependent on the accuracy of Optical Character Recognition (OCR) after raw data encoded in bar and pie charts are recovered. Visual Question Answering (VQA) requires co-reasoning over both image and textual questions to generate an answer. Most VQA tasks have been implemented by following a pipeline which consists of learning visual features of an image using convolutional neural networks (CNN) and long short term memory (LSTM) networks based question embeddings. These two features are combined together to generate an answer. Stacked attention methods and co-attention between question and image further improves performance of the VQA tasks. However, VQA tasks learn a direct mapping between inputs and outputs and do not explicitly reason to generate an answer to a question and hence tend to learn data biases. Visual reasoning over statistical charts addressed in the present disclosure is related to VQA with a difference that VQA aims to generate answers by formulating the problem as a classification task and selecting an answer to a visual question from a pre-defined answer list. Hence VQA suffers from the limitation of not being able to give chart specific textual answers present on chart images.

Systems and methods of the present disclosure address the technical problem of extracting information from statistical charts as a visual reasoning problem, where given a question regarding the content and relationship between elements of charts, the question is answered by reasoning over the chart's visual percepts. Systems and methods of the present disclosure may find application by visually impaired individuals for easily understanding documents containing charts and interactively extracting statistical information. There exists a plethora of tools and algorithms capable of converting text-to-speech which can help visually impaired individuals in reading and understanding documents. However, a common stumbling block occurs in understanding and analyzing information from charts embedded in the documents. Again, the systems and methods of the present disclosure may find application in automated systems that may receive the output of the systems and methods of the present disclosure as an input for further processing. For instance, visual reasoning assessment question papers may require automated interpretation of the provided answers which may be in the form of graphical illustrations.

Although further explanation of the systems and methods of the present disclosure may be directed specifically towards statistical charts and graphs, it may be understood by those of ordinary skill in the art, that visual reasoning, in the context of the present disclosure, may be performed over graphical illustrations of any form comprising data in the form of diagrams (not limiting to statistical charts) and available as images. Again, in the context of the present disclosure, the expression 'reasoning' refers to the ability to sequentially attend to different aspects of an image in response to different parts or sub-questions of a question and then integrating information acquired so far to provide an answer to the question, wherein the ability to identify the correct sequence of the sub-questions imparts a desired intelligence to the reasoning operation of the present disclosure, thereby enabling the systems of the present disclosure to address unseen questions not encountered during training.

Referring now to the drawings, and more particularly to FIG. 1 through FIG. 4B, where similar reference characters denote corresponding features consistently throughout the figures, there are shown preferred embodiments and these embodiments are described in the context of the following exemplary system and/or method.

FIG. 1 illustrates an exemplary block diagram of a system 100 for intelligent visual reasoning over graphical illustrations using a Memory, Attention and Composition (MAC) unit according to some embodiments of the present disclosure. In an embodiment, the system 100 includes one or more processors 104 being one or more hardware processors; communication interface device(s) or input/output (I/O) interface(s) 106; one or more data storage devices or memory 102 operatively coupled to the one or more processors 104; a MAC unit 108; a Regressor 110 and a Classifier 112 described later in the description. The one or more processors 104 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2A:
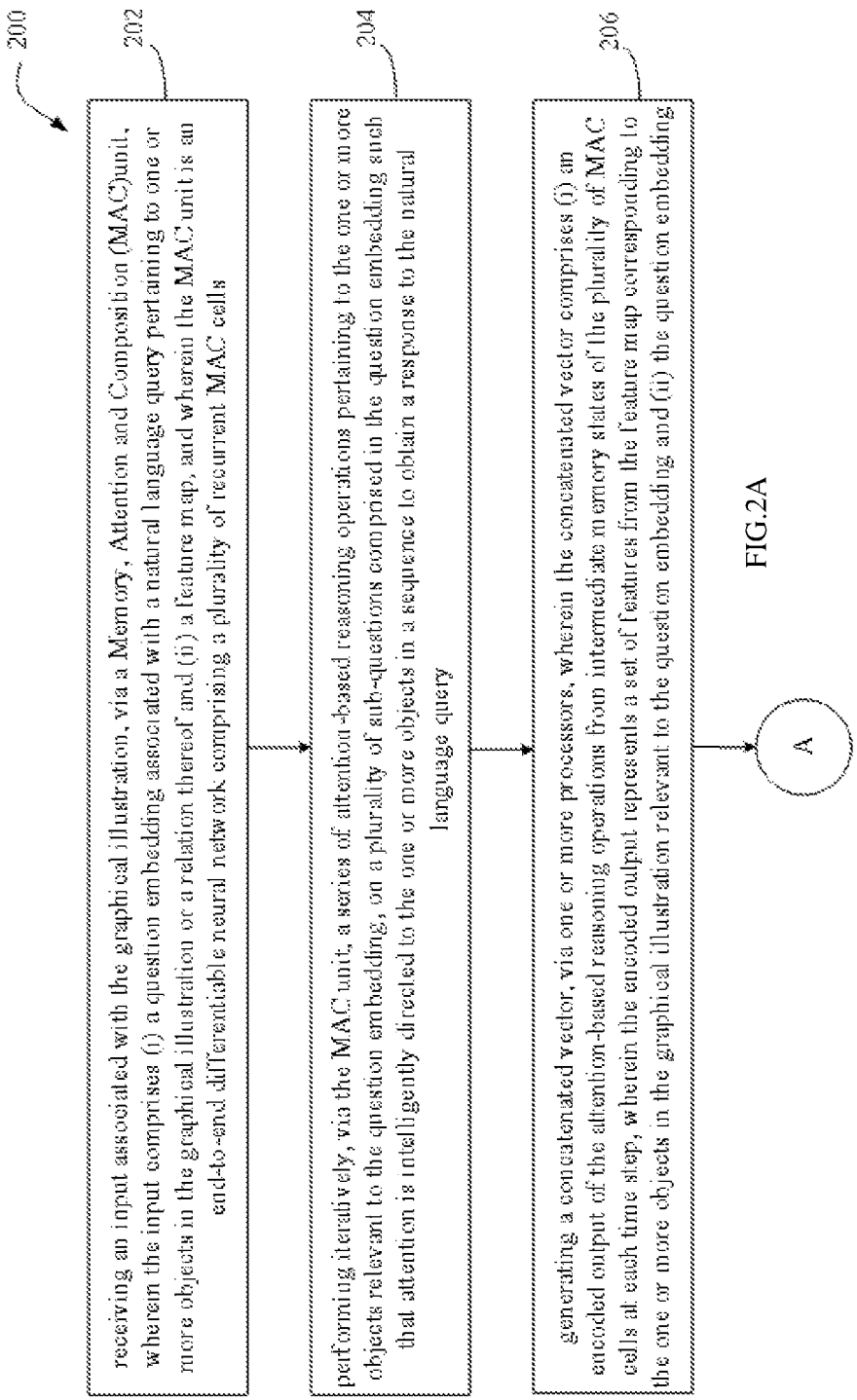
FIG. 2A through FIG. 2B illustrates an exemplary flow diagram of a computer implemented method for intelligent visual reasoning over graphical illustrations using the MAC unit, according to some embodiments of the present disclosure.
Figure 2B:
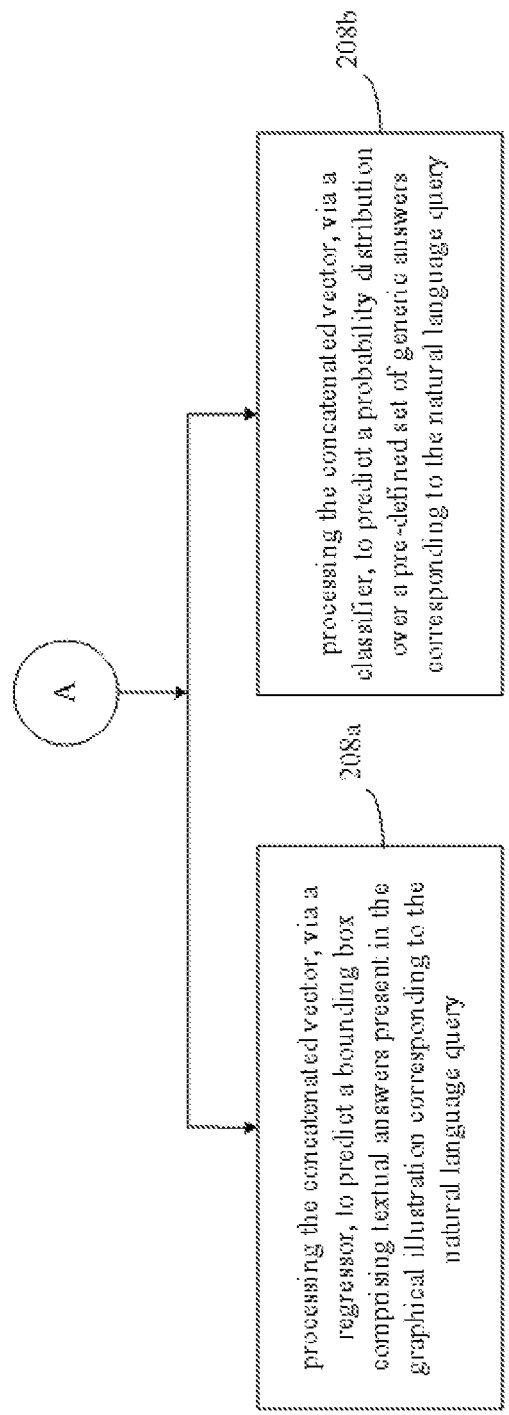

FIG. 2A through FIG. 2B illustrates an exemplary flow diagram 200 of a computer implemented method for intelligent visual reasoning over graphical illustrations using the MAC unit, according to some embodiments of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Systems of the art lack reasoning capabilities to answer questions; instead they learn dataset bias and memorize the answers. Such systems are not capable of providing answers for questions that are unseen during training. Again, there are prior art systems composed of modular networks with each module used to emulate different logical components and put together to make the model end-to-end differentiable. In order to ensure that the functionalities of the modules are made clear, they employ supervised pre-training on each of the modules on relevant individual sub-tasks. The mandatory pre-training using datasets like FigureQA (available http://arxiv.org/abs/1710.07300) and lack of reasoning capabilities make the systems of the art incapable of addressing chart specific questions which have answers present as text over chart images.

Figure 3:
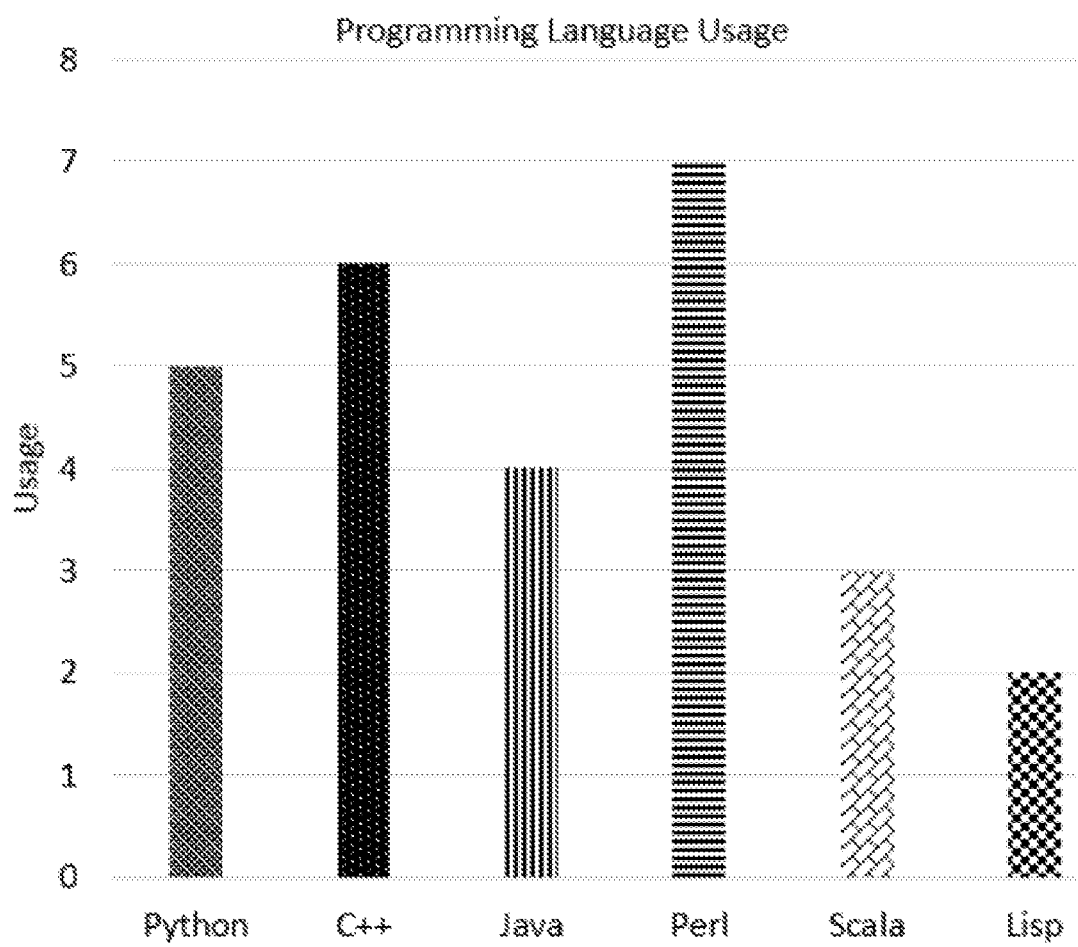
FIG. 3 illustrates an example of a bar chart, as known in the art.

To address these issues in the art, the MAC unit 108 is employed to reason over graphical illustrations like bar chart, pie chart, and the like. The MAC unit is an end-to-end differentiable neural network composed of MAC cells responsible for performing a series of reasoning steps for solving a complex problem. MAC cells are recurrent networks similar to Long short-term memory (LSTM) with two hidden states—control and memory. The control state contains the identity of the reasoning operation that needs to be performed while the memory state stores the intermediate results computed in the recurrent reasoning process so far. The MAC unit decomposes the question into a series of sub-questions that are further addressed by attention-based reasoning operations each performed by a MAC cell. FIG. 3 illustrates an example of a bar chart, as known in the art. The exemplary graphical illustration is a plot of the usage of programming language (along y-axis) versus the name of the programming language (along x-axis). The colors of the bar chart are represented by different hatch pattern in FIG. 3 as follows:

Blue color bar: 40% hatch pattern
Yellow color bar: 50% hatch pattern
Red color bar: narrow vertical hatch pattern
Green color bar: narrow horizontal hatch pattern
Cyan color bar: diagonal brick hatch pattern
Black color bar: large checker board hatch pattern To answer a question like "What is the color of the bar rightmost to the black color bar (represented by large checker board hatch pattern) and larger than the blue color bar (represented by 40% hatch pattern)" in FIG. 3, the MAC unit 108 starts by decomposing the question into a plurality of sub-questions and then finds the bar rightmost to the black color bar; shifts its attention to finding the rightmost bar larger than the blue color bar by implicitly analyzing the heights of the bars based on y-axis and reaches the answer "Yellow/C++".

The question when formulated as a classification task, provides answers from a pre-defined vocabulary of generic answers. However, to address open-ended questions about contents of the chart or relationships between them, the MAC unit is augmented with a regression layer in place of the classification layer(s). The regression feature provides the ability to regress over chart images to find a bounding box of the correct textual answer which can then be read by OCR.

For visual reasoning over a graphical illustration like say, a bar or pie chart, the image and corresponding reasoning questions are provided. In accordance with the present disclosure, the reasoning questions are natural language queries obtained by any means. For instance, they may be generated by a speech-to-text converter or may be typed by a user.

Figure 4A:
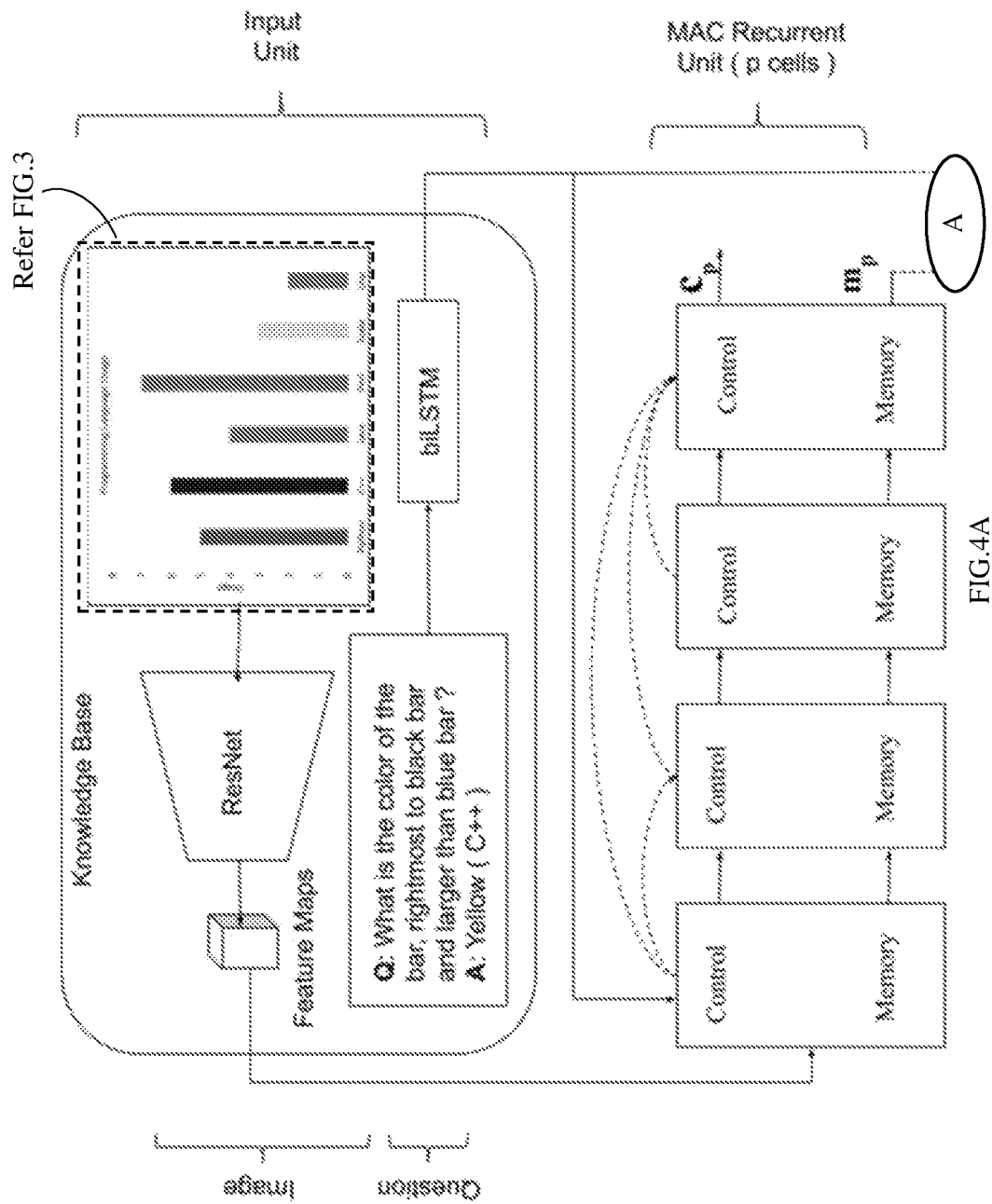
FIG. 4A through FIG. 4B illustrates the architecture of the system of FIG. 1 according to some embodiments of the present disclosure.
Figure 4B:
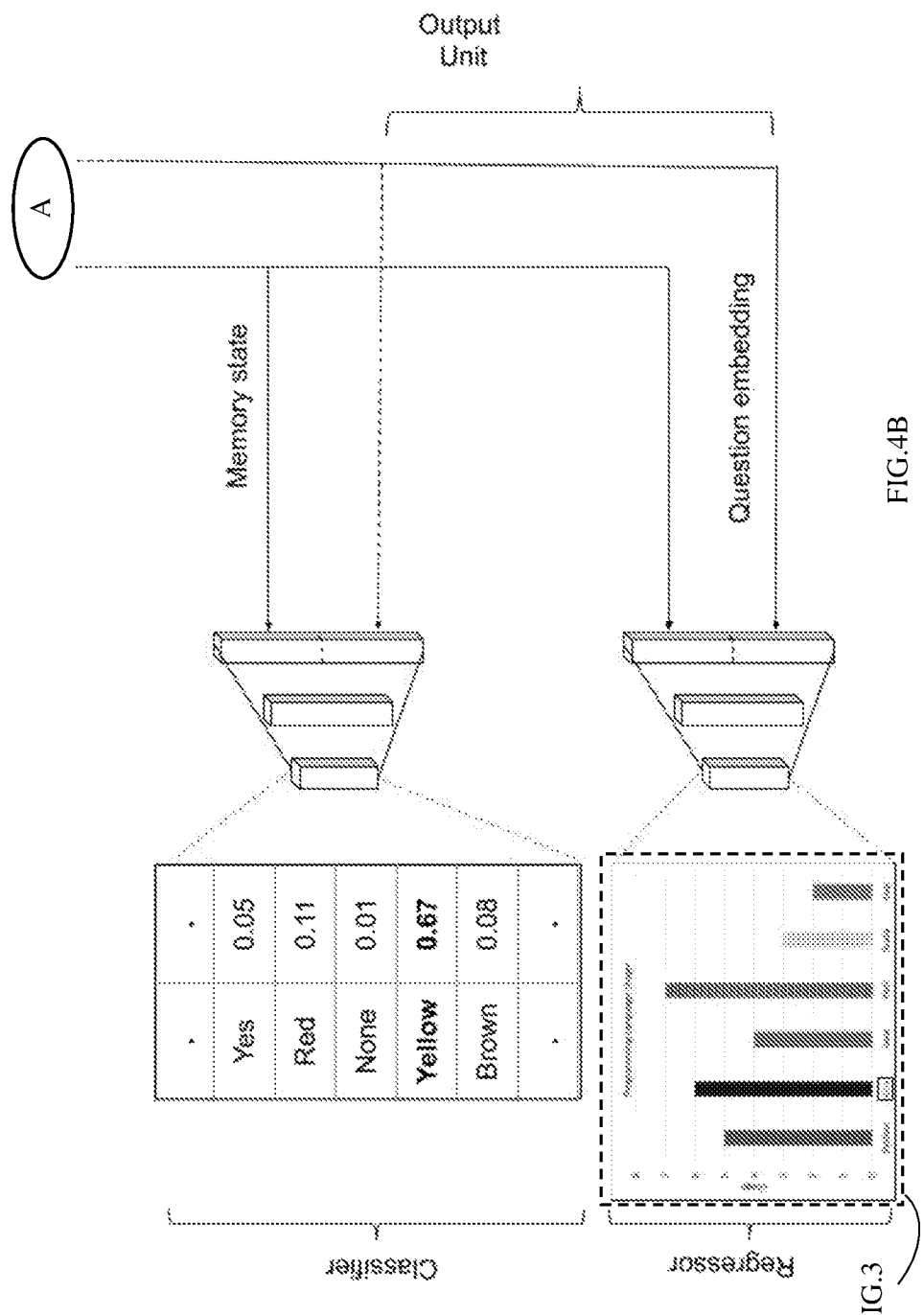

FIG. 4A through FIG. 4B illustrates the architecture of the system 100 of FIG. 1 according to some embodiments of the present disclosure. In an embodiment of the present disclosure, the system 100 primarily includes an input unit, a MAC unit 108 and an output unit.

In accordance with an embodiment of the present disclosure, an input associated with the graphical illustration is received, at step 202, via the MAC unit 108. In accordance with an embodiment, the input comprises (i) a question embedding associated with a natural language query pertaining to one or more objects (sections or regions) from a plurality of objects in the graphical illustration or a relation therebetween and (ii) a feature map for the plurality of objects.

In an embodiment, the question embedding may be generated by a pre-trained Recurrent Neural Network (RNN), the question embedding corresponding to the natural language query; and the feature map may be generated by a pre-trained Convolutional Neural Network (CNN) based residual network, the feature map corresponding to the graphical illustration, wherein the pre-trained RNN and the pre-trained CNN form part of the input unit of the system 100. In an embodiment, the pre-trained CNN based network is a residual neural network (ResNet) and the pre-trained RNN is a bi-directional Long Short-Term Memory (biLSTM).

Accordingly, the images (e.g. FIG. 3) are first provided as an input to say the pre-trained ResNet for conv4 layer feature map extraction. For an input image I, the resulting collection of features (tensor) are further processed by a two convolutional layer CNN architecture with depth d. A knowledge base is defined as $$K^{W \times H \times D} = \left\{ k_{h,w}^d \,\middle|\, \begin{array}{c} H, W \\ h, w = 1, 1 \end{array} \right\},$$

where H=W=14 represents the height and width of a processed image. A question string is initialized by a sequence of learned word embeddings and is further processed by the biLSTM. The question embedding is then defined as $q = [\overleftarrow{cw_1}, \overrightarrow{cw_S}]$, where q is the concatenation of the LSTM's forward and backward hidden states. Essentially, the question embedding is a high dimensional real valued vector. The input to the biLSTSM at each timestep is a question embedding for each word sampled from a standard word embedding model.

In accordance with an embodiment of the present disclosure, a series of attention-based reasoning operations pertaining to the one or more objects relevant to the question embedding are performed iteratively, at step 204, via the MAC unit 108. The MAC unit 108 comprises three neural units namely, a control unit, a read unit and a write unit that modify its dual hidden states—control and memory to perform atomic reasoning operations at each timestep. Therefore, at each timestep i=1, . . . p, the $i^{th}$ hidden state consists of the control state $c_i$ which represents the reasoning operation to be performed at a current timestep, and the memory state $m_i$ which encodes the intermediate result after reasoning. The attention-based operations are performed iteratively on a plurality of sub-questions comprised in the question embedding such that attention is intelligently directed to the one or more objects in a sequence to obtain a response to the natural language query.

In accordance with an embodiment of the present disclosure, the operations are performed as under.

The control unit determines the reasoning operation to be performed at each timestep i and updates the control state $c_i$. It selectively attends to the question embeddings $c_{w1}, \ldots c_{wS}$ and uses a position-aware representation $q_i$ and prior control output $c_{i-1}$ to modify the current control state.

The read unit retrieves information $r_i$ for the $i^{th}$ reasoning step by inspecting the knowledge base $k_{h,w}^d$. The relevance is by attention distribution $rv_i$ that assigns a probability to each item in the knowledge base which is calculated using the current control state $c_i$, representing the reasoning operation to be performed and the prior memory state $m_{i-1}$ which encodes the last intermediate result.

The write unit computes the intermediate reasoning output in the $i^{th}$ timestep and combines it with the memory state $m_i$. Specifically, it integrates the information retrieved from the read unit $r_i$ with previous intermediate output $m_{i-1}$, guided by the present control state $c_i$.

Accordingly, in an embodiment, the one or more processors 104, are configured to generate, at step 206, a concatenated vector comprising (i) an encoded output $m_p$ of the attention-based reasoning operations from intermediate memory states $m_i$ of the plurality of MAC cells at each timestep i, wherein the encoded output $m_p$ represents a set of features from the feature map corresponding to the one or more objects in the graphical illustration relevant to the question embedding and (ii) the question embedding.

The output unit is composed of two fully connected networks viz., the regressor 110 and the classifier 112 which share the common MAC backbone, for performing the dual task of regressing the coordinates of the image specific answers by the regressor 110 and predicting the answers from a vocabulary in case of generic questions by the classifier 112. As each intermediate memory state encodes the reasoning output at that step, a concatenation of the same with the question embedding is used to generate the answers. Simply using the image features cannot produce the desired answer. In either case, the classifier and the regressor, both need to use the image features in conjunction with the question embedding to effectively answer the question.

In accordance with the present disclosure, the concatenated vector forms an input for both the regressor 110 and the classifier 112. In an embodiment, the concatenated vector, is processed at step 208a, via the regressor 110 to predict a bounding box comprising textual answers present in the graphical illustration (e.g. FIG. 3) corresponding to the natural language query. The bounding box may then be read by OCR.

In an embodiment, the step of processing the concatenated vector via the regressor to predict a bounding box comprises generating a 4-dimensional vector, through a sigmoid non-linearity, in which each dimension represents a coordinate value, normalized in the range 0 to 1. The regressor 110, being a three layered neural network performs a series of non-linear transformation of the form, $f((W^T \times X)+B)$, wherein W represent weight of a particular layer, X represents an input to that layer, and B represents the bias of that layer. The transformation performed converts the concatenated vector to the 4-dimensional vector containing the coordinates for the bounding box.

Again, in an embodiment, the concatenated vector, is processed at step 208b, via the classifier 112 to predict a probability distribution over a pre-defined set of generic answers corresponding to the natural language query through a softmax normalization. In accordance with the present disclosure, either the regressor 110 or the classifier 112 may generate a response depending on whether the question is a specific question requiring an answer to be derived from the image or a generic question respectively.

In an embodiment, the regressor 110 is pre-trained using mean square error for a regression task and the classifier 112 is pre-trained using a categorical cross-entropy loss for a classification task DATASET: Datasets available in the public domain such as FigureQA dataset for visual reasoning over charts by S. E. Kahou et al. contains questions that involve generic answers like YES or NO and not have questions that involve chart specific answers. The Applicant has therefore created statistical chart datasets consisting of bar and pie charts with corresponding question-answer pairs containing generic answers and bounding box annotations of chart specific textual answers present over the images. The bar charts dataset consists of vertical bars and was created by varying the height and number of colors of the bars. The colors were chosen from a predefined list of colors. 10 question-answer pairs were also created for each bar chart image. The questions were designed to test the capabilities of the method 200 of the present disclosure in answering questions based on the understanding of the graphical illustration (charts in the tested scenario), retrieving data from chart images by extracting individual components from the chart images and reasoning over them which involves collecting information from multiple objects comprised in the carts and performing operations on the perceived information. The dataset used in the present disclosure follows the general VQA setup but bounding box annotations of textual content present over the chart images were also saved for training the MAC unit to generate answers unique to a particular chart by learning to regress over bounding boxes of textual answers.

Some examples of questions asked for chart images are given below
What is the color of the highest bar?
What is the color of the bar; left to the largest bar?
Does there exist a green color bar?
What is the color of the bar; just right to the red color bar?
What is the color of the bar; rightmost to the black color bar and larger than blue bar?

Similarly, a dataset for pie-charts was created by varying the angles and colors of sectors. Some example questions for pie-charts are given below.
What is the color of the largest region in pie chart?
What is the color of the smallest region in pie chart?
What is the color of the region; next to the largest region if you move anti-clockwise?
Does there exist a yellowgreen color region?

Both the datasets (bar chart and pie chart) consisted of 2000, 500 and 500 chart images for training, validation and testing respectively. Therefore, a total number of image question answer pair examples for training, validation and testing are 20000, 5000 and 5000 respectively for each dataset.

Experimental Results

Various experiments were performed to measure the performance of the systems and methods of the present disclosure, in accordance with some embodiments.

Experimental Setup

Both the classifier and the regression network of the present disclosure use two fully connected layers with the hidden layer having 512 units. For training, a batch size of 128 in a Tesla V100 GPU machine was used. The Adam optimizer with a learning rate of 0.00001 was used and the network was trained for 25 epochs at which the best validation accuracy was achieved. The optimal number of epochs required for training of the MAC unit is determined by optimizing the validation loss.

Baseline Networks

The performance of the systems and methods of the present disclosure, in accordance with some embodiments were evaluated for visual reasoning tasks and compared against the following three baselines.

- LSTM network: In this baseline, only questions are used to generate the answers. The questions are embedded using LSTM encoder and then the answer is predicted by a multi-layer perceptron (MLP) that has 1024 units and a softmax output which gives probability distribution over the answers.
- CNN+LSTM networks: This method uses a CNN to extract visual features of the chart images and an LSTM to embed textual features of the questions. Both the features are then combined and passed to an MLP (Multilayer Perception) which predicts the answer to the question.
- CNN+SA-LSTM (Syntax Aware Long Short Time Memory) networks: In this baseline, the image and questions are embedded using CNNs and LSTMs respectively. The concatenated features are then passed through two rounds of soft spatial attention; a linear transform of the attention output predicts the answer.

Results

The systems and methods of the present disclosure, in accordance with some embodiments, were used as a classifier to select answers from a pre-defined set of generic answers for visual reasoning over the charts. The classification accuracy is used as a performance measure and is defined as the fraction or percentage of the questions correctly answered.

TABLE I

Comparison of classification accuracy in % for pie-chart reasoning using the system of the present disclosure as a classifier.

| Model | Classification Accuracy (%) |
|---|---|
| LSTM | 42.77 |
| CNN + LSTM | 67.46 |
| CNN + SA-LSTM | 80.68 |

TABLE I-continued

Comparison of classification accuracy in % for pie-chart reasoning using the system of the present disclosure as a classifier.

| Model | Classification Accuracy (%) |
|---|---|
| System/Method of the present disclosure | 91.42 |

As seen from Table I above, the accuracy is very low (42.77%) when only LSTM features of questions were used to generate the answer. However, on combining LSTM embeddings of questions with visual features of the chart images extracted using the CNN, the accuracy improved by 25% which was further increased on augmenting the CNN and LSTM features with a stacked attention network. The attention network learns to focus on most relevant regions of the images for answering a question and boosts the classification accuracy to 80.68%. When the system and method of the present disclosure was used for visual reasoning over the chart images to give generic answers, it surpassed the state-of-the-art with an accuracy of 91.42%, thereby proving the capabilities of visual reasoning over statistical charts of the methods and systems of the present disclosure.

Further testing was performed to compare the performance of the systems and methods of the present disclosure, in accordance with some embodiments, against the baselines mentioned above for bar charts.

TABLE I

Comparison of classification accuracy in % for bar chart reasoning using the system of the present disclosure as a classifier.

| Model | Classification Accuracy (%) |
|---|---|
| LSTM | 41.78 |
| CNN + LSTM | 86.95 |
| CNN + SA-LSTM | 89.19 |
| System/Method of the present disclosure | 98.14 |

As seen from Table II above, when the system and method of the present disclosure was used for visual reasoning over the chart images, a classification accuracy of 98.14% was achieved.

Again, the systems and methods of the present disclosure, in accordance with some embodiments, were further tested when used as a regressor to predict bounding boxes of textual answers present on images to give answers to open-ended questions. The performance measure used is Intersection over Union overlap (IOU) for bounding box regression. Mean IOU obtained for a test set was 0.84. To present results in terms of classification accuracy, a lower threshold of 0.8 was used on IOU which means that if IOU of bounding box of an answer for a question is greater than 0.8, the answer is correct. Using this assumption, a classification accuracy of 91.2% was obtained for the test set for unseen or open-ended questions.

Thus, in accordance with the present disclosure, the systems and methods of the present disclosure solves the technical problem of visual reasoning over graphical illustrations such as charts and graphs that may be present in a document. The reasoning over the graphical illustration caters to two types of questions: (i) questions related to the charts and graphs that have answers from a generic list of answers such as Yes, No, Color, etc. and (ii) questions specific to the graphs and charts not having answers in the generic list like text available in the illustration. The architecture illustrated in FIG. 4A through FIG. 4B shows an end-to-end trainable network capable of answering questions of varying complexity without explicit training on similar questions as the network learns to reason over the questions using the MAC unit 108 and not just memorize the answers seen during training. The MAC unit 108 employs a control, read and write unit along with a memory cell to hold the knowledge acquired so far. The read unit iteratively acquires new information which are processed by the control unit and then written into the memory unit. Augmenting the MAC unit 108 (traditionally used with a classifier) with regression capabilities using the regressor 110 facilitates generating chart specific answers by localizing the text present over the chart images. It has also been proven using experiments that the MAC unit based systems and methods of the present disclosure not only work better with regression capabilities but also have improved classification results. Thus, the present disclosure achieves a technical advance by facilitating intelligent visual reasoning rather than memorizing the answers seen during training. Processing documents like business reports, research papers, consensus reports etc. containing charts manually is a cumbersome task and if this processing is automated, it would be of great utility to human analysts and visually impaired individuals in understanding of visual information and would also reduce the time spent in manual analysis. The processed information may also serve as an input to other automated systems for further analyses.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the present disclosure or if they include equivalent elements with insubstantial differences from the literal language of the embodiments described herein.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated herein.

The invention claimed is:

1. A method for intelligent visual reasoning over a graphical illustration, the method comprising the steps of:
    receiving an input associated with the graphical illustration, via a Memory, Attention and Composition (MAC) unit, wherein the input comprises (i) a question embedding associated with a natural language query pertaining to one or more objects from a plurality of objects in the graphical illustration or a relation therebetween and (ii) a feature map for the plurality of objects, and wherein the MAC unit is an end-to-end differentiable neural network comprising a plurality of recurrent MAC cells, wherein the MAC unit comprises three neural units namely, a control unit, a read unit and a write unit;
    performing iteratively, via the MAC unit, a series of attention-based reasoning operations pertaining to the one or more objects relevant to the question embedding, on a plurality of sub-questions comprised in the question embedding such that attention is intelligently directed to the one or more objects in a sequence to obtain a response to the natural language query, wherein the MAC unit modifies the MAC unit's dual hidden states, control and memory, to perform reasoning operations at each timestep, wherein at each timestep i=1, . . . p, an $i^{th}$ hidden state consists of a control state $c_i$ which represents the reasoning operation to be performed at a current timestep, and a memory state $m_i$ which encodes an intermediate result after reasoning;
    generating a concatenated vector, via one or more processors, wherein the concatenated vector comprises (i) an encoded output $m_p$ of the attention-based reasoning operations from the memory states $m_i$ of the plurality of MAC cells at each of the time step i, wherein the encoded output $m_p$ represents a set of features from the feature map corresponding to the one or more objects in the graphical illustration relevant to the question embedding and (ii) the question embedding;
    processing the concatenated vector, via a regressor, to predict a bounding box comprising textual answers present in the graphical illustration corresponding to the natural language query, wherein the regressor is pre-trained using mean square error for a regression task and the classifier is pre-trained using a categorical cross-entropy loss for a classification task; and
    processing the concatenated vector, via a classifier, to predict a probability distribution over a pre-defined set of generic answers corresponding to the natural language query.

2. The processor implemented method of claim 1, wherein the step of receiving a question embedding and a feature map as input is preceded by:
    generating, by a pre-trained Convolutional Neural Network (CNN) based residual network, the feature map corresponding to the graphical illustration; and
    generating, by a pre-trained Recurrent Neural Network (RNN), the question embedding corresponding to the natural language query.

3. The processor implemented method of claim 2, wherein the pre-trained CNN based network is a residual neural network (ResNet) and the pre-trained RNN is a bi-directional Long Short-Term Memory (biLSTM).

4. The processor implemented method of claim 1, wherein the step of processing the concatenated vector, via a regressor, to predict a bounding box comprises generating a 4-dimensional vector, through a sigmoid non-linearity, in which each dimension represents a coordinate value, normalized in the range 0 to 1, and wherein the regressor is a three layered neural network configured to perform a series of non-linear transformation of form, f((WTxX)+B), wherein W represent weight of a particular layer, X represents an input to the particular layer, and B represents the bias of the particular layer, and the transformation performed by the regressor converts the concatenated vector to the 4-dimensional vector containing coordinates for the bounding box.

5. A system for intelligent visual reasoning over a graphical illustration, the system comprising one or more data storage devices operatively coupled to one or more hardware processors and configured to store instructions executable by the one or more hardware processors to perform operations comprising:
    receiving an input associated with the graphical illustration, via a Memory, Attention and Composition (MAC) unit, wherein the input comprises (i) a question embedding associated with a natural language query pertaining to one or more objects from a plurality of objects in the graphical illustration or a relation therebetween and (ii) a feature map for the plurality of objects, and wherein the MAC unit is an end-to-end differentiable neural network comprising a plurality of recurrent MAC cells, wherein the MAC unit comprises three neural units namely, a control unit, a read unit and a write unit that;

performing iteratively, via the MAC unit, a series of attention-based reasoning operations pertaining to the one or more objects relevant to the question embedding, on a plurality of sub-questions comprised in the question embedding such that attention is intelligently directed to the one or more objects in a sequence to obtain a response to the natural language query, wherein the MAC unit modifies the MAC unit's dual hidden states, control and memory, to perform atomic reasoning operations at each timestep, wherein at each timestep i=1, ... p, an $i^{th}$ hidden state consists of a control state $c_i$ which represents the reasoning operation to be performed at a current timestep, and a memory state $m_i$ which encodes an intermediate result after reasoning;

generating a concatenated vector wherein the concatenated vector comprises (i) an encoded output $m_p$ of the attention-based reasoning operations from the memory states $m_i$ of the plurality of MAC cells at each time step i, wherein the encoded output $m_p$ represents a set of features from the feature map corresponding to the one or more objects in the graphical illustration relevant to the question embedding and (ii) the question embedding;

processing the concatenated vector, via a regressor, to predict a bounding box comprising textual answers present in the graphical illustration corresponding to the natural language query, wherein the regressor is pre-trained using mean square error for a regression task and the classifier is pre-trained using a categorical cross-entropy loss for a classification task; and processing the concatenated vector, via a classifier, to predict a probability distribution over a pre-defined set of generic answers corresponding to the natural language query.

6. The system of claim 5, further comprising a pre-trained Convolutional Neural Network (CNN) based residual network configured to generate the feature map corresponding to the graphical illustration and a pre-trained Recurrent Neural Network (RNN) configured to generate the question embedding corresponding to the natural language query.

7. The system of claim 6, wherein the pre-trained CNN based network is a residual neural network (ResNet) and the pre-trained RNN is a bi-directional Long Short-Term Memory (biLSTM).

8. The system of claim 5, wherein the regressor is configured to process the concatenated vector for predicting a bounding box by generating a 4-dimensional vector, through a sigmoid non-linearity, in which each dimension represents a coordinate value, normalized in the range 0 to 1, and wherein the regressor is a three layered neural network configured to perform a series of non-linear transformation of form, $f((W^T \times X)+B)$, wherein W represent weight of a particular layer, X represents an input to the particular layer, and B represents the bias of the particular layer, and the transformation performed by the regressor converts the concatenated vector to the 4-dimensional vector containing coordinates for the bounding box.

9. A computer program product comprising a non-transitory computer readable medium having a computer readable program embodied therein, wherein the computer readable program, when executed on a computing device, causes the computing device to:

receive an input associated with the graphical illustration, via a Memory, Attention and Composition (MAC) unit, wherein the input comprises (i) a question embedding associated with a natural language query pertaining to one or more objects from a plurality of objects in the graphical illustration or a relation therebetween and (ii) a feature map for the plurality of objects, and wherein the MAC unit is an end-to-end differentiable neural network comprising a plurality of recurrent MAC cells, wherein the MAC unit comprises three neural units namely, a control unit, a read unit and a write unit;

perform iteratively, via the MAC unit, a series of attention-based reasoning operations pertaining to the one or more objects relevant to the question embedding, on a plurality of sub-questions comprised in the question embedding such that attention is intelligently directed to the one or more objects in a sequence to obtain a response to the natural language query, wherein the MAC unit modifies the MAC unit's dual hidden states, control and memory, to perform atomic reasoning operations at each timestep, wherein at each timestep i=1, ... p, an $i^{th}$ hidden state consists of a control state $c_i$ which represents the reasoning operation to be performed at a current timestep, and a memory state $m_i$ which encodes an intermediate result after reasoning;

generate a concatenated vector wherein the concatenated vector comprises (i) an encoded output $m_p$ of the attention-based reasoning operations from the memory states $m_i$ of the plurality of MAC cells at each of the time step i, wherein the encoded output $m_p$ represents a set of features from the feature map corresponding to the one or more objects in the graphical illustration relevant to the question embedding and (ii) the question embedding;

process the concatenated vector, via a regressor, to predict a bounding box comprising textual answers present in the graphical illustration corresponding to the natural language query, wherein the regressor is pre-trained using mean square error for a regression task and the classifier is pre-trained using a categorical cross-entropy loss for a classification task; and process the concatenated vector, via a classifier, to predict a probability distribution over a pre-defined set of generic answers corresponding to the natural language query.

* * * * *